United States Patent [19]

Chesnutt

[11] Patent Number: 4,979,585
[45] Date of Patent: Dec. 25, 1990

[54] COMPOUND SUSPENSION LINKAGE

[75] Inventor: Dennis P. Chesnutt, Houston, Tex.

[73] Assignee: Halliburton Logging Services, Inc., Houston, Tex.

[21] Appl. No.: 415,840

[22] Filed: Oct. 2, 1989

[51] Int. Cl.$^5$ .............................................. G01V 1/40
[52] U.S. Cl. ................................ 181/102; 181/105; 181/401; 367/25; 367/911
[58] Field of Search .................... 367/25, 35, 36, 911; 181/102, 104, 105, 401

[56] References Cited

U.S. PATENT DOCUMENTS

| | | | |
|---|---|---|---|
| Re. 32,070 | 1/1986 | Vezin | 324/347 |
| 2,876,413 | 3/1959 | Saurenman et al. | 324/347 |
| 3,167,707 | 1/1965 | Oliver | 324/347 |
| 3,685,158 | 8/1972 | Planche | 33/178 F |
| 3,977,468 | 8/1976 | Brewer et al. | 166/241 |
| 4,121,345 | 10/1978 | Roesner | 74/105 |
| 4,243,099 | 1/1981 | Rodgers, Jr. | 166/250 |
| 4,432,143 | 2/1984 | Moriarity et al. | 33/178 F |
| 4,480,186 | 10/1984 | Wolk | 250/268 |
| 4,563,757 | 1/1986 | Decorps et al. | 367/33 |
| 4,575,831 | 3/1986 | Decorps et al. | 367/33 |
| 4,588,951 | 5/1986 | Ohmer | 324/367 |
| 4,594,552 | 6/1986 | Grimaldi et al. | 324/375 |
| 4,596,143 | 6/1986 | Norel | 367/35 |
| 4,614,250 | 9/1986 | Panetta et al. | 181/102 |
| 4,641,724 | 2/1987 | Chow et al. | 181/104 |
| 4,784,238 | 11/1988 | Maissa | 181/105 |

Primary Examiner—Charles T. Jordan
Assistant Examiner—J. Woodrow Eldred
Attorney, Agent, or Firm—William J. Beard

[57] ABSTRACT

An elongate multilink compound suspension arm is set forth for positioning a sensor parallel to and spaced from a sonde. In particular, it includes first and second approximately parallel arms pivotally connected to a third arm. There are control members additionally included which may be pushed or pulled as appropriate to cause extension arm assembly to move from a fully retracted position in a receptacle along the sonde to an angle extended outwardly and to the rear of the sonde. A sensor pad is supported at the back end and extends toward the back end of the sonde. The sensor pad is pivotally mounted, and is connected with a resilient means for urging the sensor pad into facial contact with the side wall of the borehole. The multilink system particularly enables the sensors on the sensor pad to maintain facial contact with the borehole at a variable distance from the sonde and parallel or at appropriate angles relative to the central axis of the sonde.

12 Claims, 2 Drawing Sheets

COMPOUND SUSPENSION LINKAGE

BACKGROUND OF THE DISCLOSURE

The present disclosure is directed to a compound suspension linkage and in particular such a system for installation on a well logging tool for use in well boreholes to position an oil well survey instrument on a extendable pad for contact against the side wall of the borehole. Caliper measurements can be obtained also. The present apparatus is used with a logging tool which requires contact against the side wall. It is necessary to accommodate a number of factors in accomplishing side wall logging. First of all, the pad must be positioned against the side wall for skidding movement as the well tool is retrieved on the logging cable in the borehole to the sonde. Many factors come into play, all having a bearing on the lateral load applied by the sensor pad to the borehole. For instance, variations in hole diameter are typically encountered. It is necessary therefore to provide a suspension system which deflects to position a sensor pad at the side wall which can flex or rotate relative to the tool body as variations in hole diameter are encountered. The position of the sonde may be precisely on the center line or may be off to the side. Another factor which is important is the provision of a relatively constant lateral load. The force should be the same without regard to the lateral deflection of the sensor pad. The sensor pad may momentarily slide past hard rock formations or may slide past unconsolidated sands. In all instances, the side wall typically will be coated with drilling fluid which forms a mud cake. The drilling fluid is typically formed of barites, and will vary in thickness. It is intended to coat the side wall and form a sealing surface sometimes known as a mud cake. The sensor pad must slide over this mud cake and yet maintain an approximately constant lateral load against the side wall of the borehole. The present apparatus is intended for use in wells that are vertical, or nearly so. In addition, it is successful in highly deviated wells where the tool is inclined at a severe angle relative to gravity. In that instance, the compound suspension linkage of the present disclosure may be required to support a substantial load. Even still, the load on the sensor pad must be variable so that it is held approximately constant in load. Variations in sensor pad loading might produce a different in the coupling of the sensor pads to the formations adjacent to the borehole and might have an undesirable impact on the quality of data. The present disclosure sets forth a system whereby the sensor pad is extended to the side of a sonde from a retracted or streamlined position. In the streamlined state, the sensor pad is fully retracted into a cavity out of harms way and the sonde is therefore able to enter the most narrow of boreholes. Deployment causes the sensor pad to position laterally to the side with controlled loading to maintain contact against the borehole. Since this must occur with a controlled force whether the well is vertical or highly deviated, the present apparatus must provide a variable force to accommodate the changes in tool orientation. It is therefore desirable to provide flexure with a spring loading system for urging the sensor pad against the borehole.

An important feature of the present disclosure is the ability to also measure the caliper of the hole. This depends on the extension of the suspension linkage and a sensor is included for measurement of that. When the tool is fully retracted, a sensor measurement is formed which indicates this retraction. When the linkage is extended, such movement is noted, and various points between are likewise indicated with accurate measurement.

There are many alternate structures known in the art and one is indicated by U.S. Pat. No. 3,167,707. In this disclosure, and in particular FIGS. 1 and 2d, a type of double pivot pantogram is set forth where one leg of the pantogram terminates in a tab connected with a motor device for applying rotating movement to one side of the pantogram, hence causing the entire structure to move. This system incorporates the sensor pad as one side of pantogram. A similar pantogram is also shown in U.S. Pat. No. 4,614,250 where FIG. 4 thereof incorporates a spring attached to the center of the sensor pad and provides a form of loading. This is achieved in a dip meter construction. These and other structures are believed to be deficient in the particulars mentioned and are devoid of features enabling flexure of the sensor pad as it rides up and down with spring loading to assure sensor pad relative rotation for smoothly sliding over irregularities in borehole profile.

The present structure is summarized as providing a compound suspension linkage construction. Rather than position the sensor pad as part of the remote pantogram side, it is affixed at one end and is mounted on a pivot which enables rotative movement of the sensor pad with respect to the central axis of the sonde which supports the structure. Moreover, a leaf spring connects to the back of the sensor pad for providing a controlled load against the borehole. The sensor pad is thus pivotally mounted at one end and is spring loaded at the central portions thereof. The sensor pad is positioned in its unloaded posture so that it is approximately parallel to the central axis of the sonde. This enables it to move outwardly through greater distances. By means of appropriate push rods with adjustable pivots, the compound linkage can extend outwardly while maintaining the sensor pad approximately parallel to the axis of the sonde. Retraction positions the sensor pad in a receptacle so that it is fully recessed and out of the way. When extended, the survey pad is lifted out of the receptacle and deployed, and later moves back into the receptacle subject to control as described.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
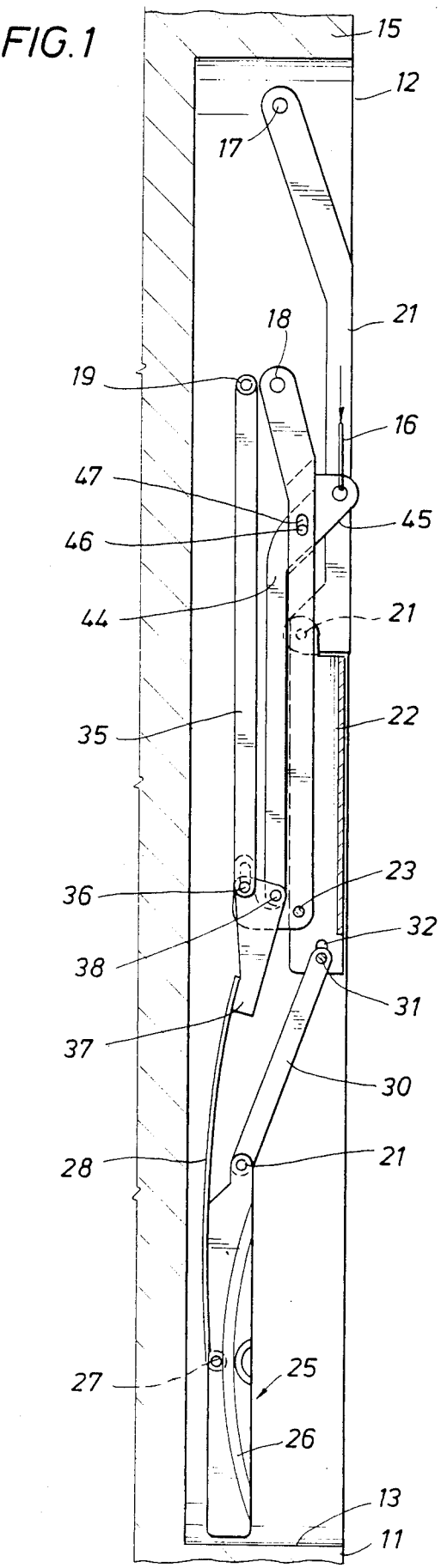
FIG. 1 is a sectional view through a portion of a sonde to be lowered into a well borehole on a logging cable and showing details of the linkage involved in the compound suspension linkage of the present disclosure for supporting the survey pad in a recessed area within the sonde.

Attention is directed first to FIG. 1 of the drawings where the numeral 10 identifies the compound linkage of the present apparatus which is installed in the body of a sonde 11 which is adapted to be suspended in a well borehole on a logging cable. The logging cable is raised in the borehole to carry the sonde 11 along the borehole to log the well. Of particular importance to the present disclosure is the incorporation of a sensor pad which is associated with certain types of logging systems. Some logging systems operate with the sonde suspended concentric in the borehole. The present disclosure, however, is directed to the family of tools which accomplish close coupling to the adjacent formation by means of a sensor pad placed against the side wall of the borehole. The present structure mounts such a sensor pad so that it is carried recessed within the sonde until extension is required, and then extension positions the survey pad against the side wall. The sensor pad and the present apparatus may optionally be duplicated on the sonde 11. Moreover, the sonde 11 can also support a backup shoe or a centralizing spring or the like, all for the purposes of forcing the sonde to the desired location within the borehole so that the articulated arm to be described below can be extended, thereby positioning the pad against the side wall. The particular survey instrument in the sonde is therefore the type requiring close contact against the side wall. The particulars of the logging system are not included in the present disclosure, but various and sundry types of logging systems can be incorporated by reference.

Figure 2:
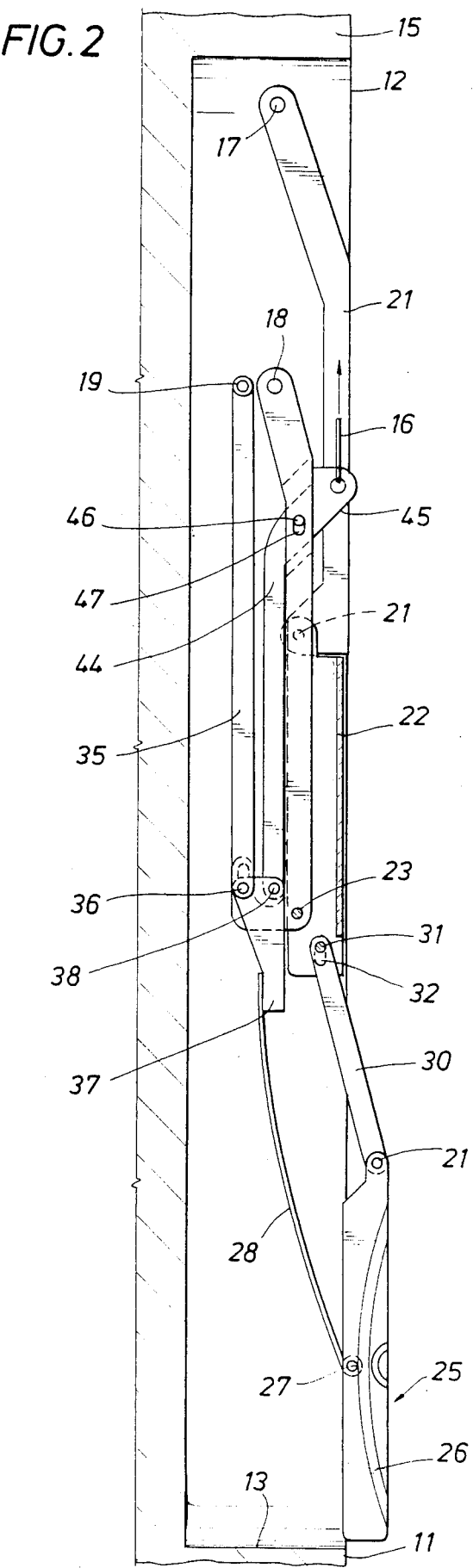
FIG. 2 is a view similar to FIG. 1 showing the first sequence of movement as the survey pad has been raised out of the receptacle therefore while the remainder of the linkage is still recessed within the sonde.
Figure 3:
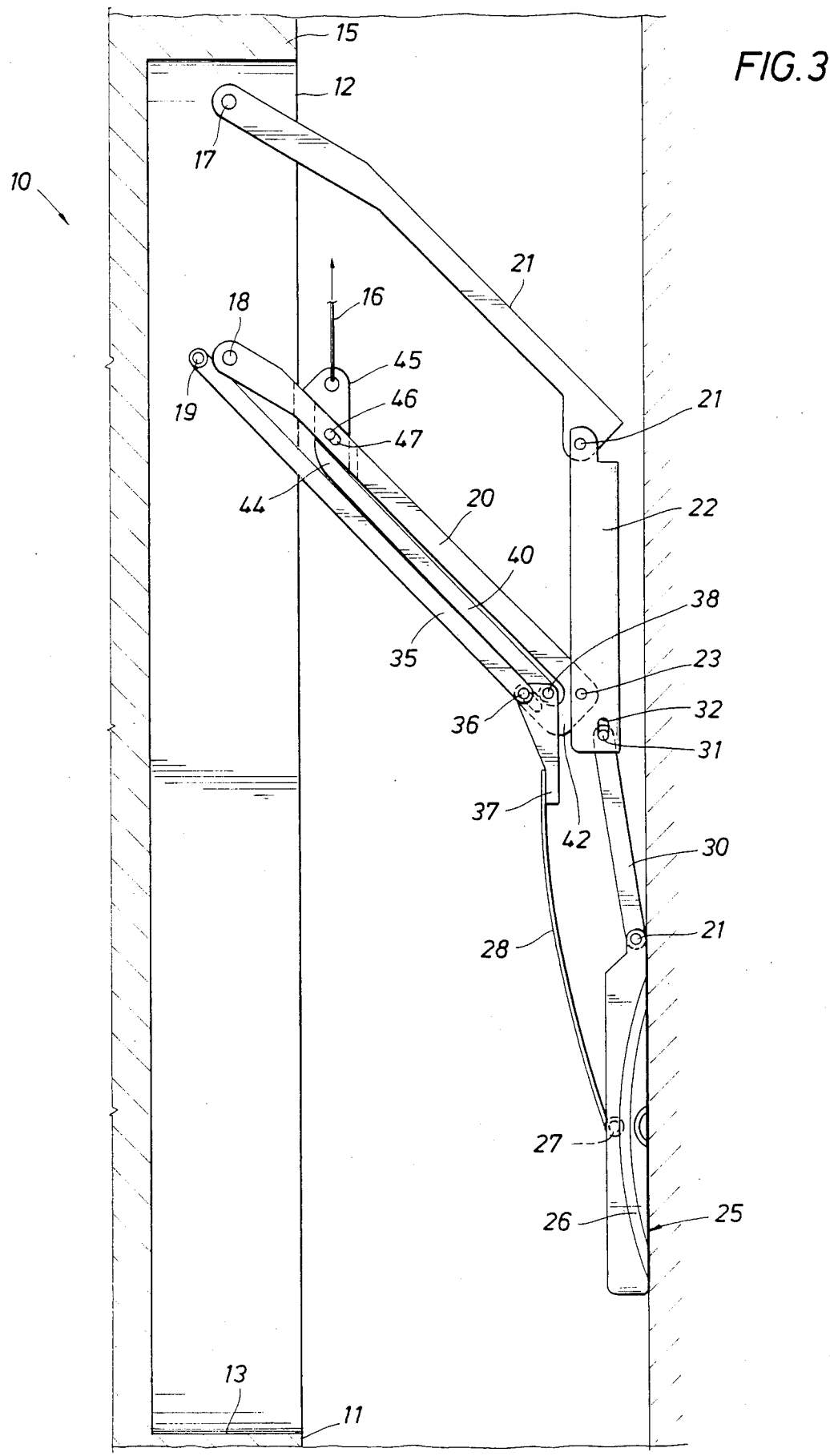
FIG. 3 shows the survey pad extended from the sonde for pressing against the well borehole with a controlled load applied against the side wall wherein the survey pad is able to ride over surface irregularities.

FIGS. 1, 2 and 3 show the present apparatus in various stages of deployment. All the components have been shown in FIG. 3 where they are spread apart; FIGS. 1 and 2 show the apparatus folded to a very compact state, thereby obscuring certain of the components. Therefore these components have been omitted or broken away to enable FIGS. 1 and 2 to show the structure mounted on the sonde in the retracted state, and it is believed that the position of the remaining components will be understood on review of FIG. 3. Of course, the omission of these components in FIGS. 1 and 2 is for the sake of clarity in description and illustration. To this end, the components will first be identified on reference to FIG. 3 of the drawings after the context has been established in FIG. 1 of the drawings relating the apparatus 10 to the sonde 11.

The sonde has an elongate cylindrical outer housing which includes the surrounding cylindrical shell 12. A conformed receptacle 13 is formed along the length of the sonde. This is sized to receive the sensor pad to be described. In addition, it has an elongate rectangular slot extending from one end of FIG. 1 to the other end at the transverse wall 14. The sonde includes a motor 15. The motor 15 connects with an elongate power rod 16. The rod 16 causes actuation of the equipment which is shown in the contrast between FIGS. 1, 2 and 3. The rod 16 is able to transmit an axial force and is used both to pull and push. The motor 15 pulls the rod 16 to the left as viewed in FIG. 1, causing rotational movement and deployment of the apparatus 10. The apparatus is tucked into the elongate rectangular receptacle 13 on extending the rod 16 to the right.

The receptacle is defined by spaced vertical walls on opposite sides of the apparatus 10. Three pins extend across or connect between the walls. They are mounting pins to support the present apparatus. The pins are identified at 17, 18 and 19. The three pins are transversely fixed between the opposing walls of the receptacle 13 and serve as pivot points for the components. The pins are conveniently fixed and support journals cylindrically therearound to connect to the respective arms to be described. The pins 17 and 18 are typically equal in diameter. The pin 19 is smaller because it supports a smaller load during operation. The pins preferably have a common length. They are spaced as shown in FIG. 1 and thereby enable the apparatus 10 to retract to the sheltered position of FIG. 1.

Going to FIG. 3 of the drawings, the various components will be identified first and then the operative relationship of these components will be set out in detail. The primary arm 20 is supported for rotation on the pin 18 while the parallel arm 21 is supported on the pin 17. The numeral 22 identifies the remote arm. Considering only these components, they form a four sided figure where all four sides are fixed in length. It is a structure able to rotate as illustrated between FIGS. 1 and 3. Pivoting enables the three arms and the sonde (functioning as the fourth side of the figure) to move in a range of movement where the remote arm 22 is parallel or approximately parallel to the center line axis of the sonde. The center line axis is defined by the structure for the sonde which is generally an elongate cylindrical member having an encircling shell or housing. The remote arm 22 is positioned in the retracted state of FIG. 1 parallel to the center line axis and immediately adjacent thereto; it has been omitted from FIG. 1 to avoid obscuring other components. As will be understood, it moves in a controlled path which is determined by the arms 20 and 21. The arms 20 and 21 are bent to the rear, and fold down into the sonde to substantially disappear in the recess provided for the arm mounted and arm actuated equipment. The two arms are approximately equal in length so that the remote arm 22 is moved in a locus which is at all times parallel or nearly so. Because of the constraints in the four cornered system (four sides and four pivot points), the path or locus for the arm 22 is believed to be readily understood.

The arms 20 and 22 are pivotally joined by a shared pivot pin 23. The arms 21 and 22 share a common pivot pin 24. A sensor pad 25 is provided with a curving back frame member 26 on the left and right sides thereof supporting a transverse pin which fits around the circular eyelet 27 on the end of a leaf spring 28. The leaf spring 28 joins to the pad and causes it to rotate in a fashion to be described. The sensor pad 25 is pivotally supported at a pin 29 which connects with a control rod 30. The rod 30 is pinned at both ends. The pin 29 permits rotation. By contrast, the opposite end of the control rod 30 connects with a pin 31. That pin is positioned in a slot which permits some slippage. The purpose of the will be more readily understood on description of operation.

The fixed pivot 19 supports another control rod 35. This control rod is connected with a rotatable pivot at the lower end and terminates at a pin 36 at the upper end. The pin 36 is fastened at one end of a bell crank 37. The bell crank is pin supported at 38. Treating the pin 38 as the pivot point, when the control rod 35 is actuated, the bell crank is caused to rotate. The bell crank is connected with the two pins mentioned and also connects with the leaf spring. The leaf spring is attached in such a fashion as to cause flexure of the leaf spring. The crank thus rotates, tending to bow the leaf spring. That applies force, of course, to the sensor pad 25, causing it to rotate as will be described.

Going back to the pin 38, It is shown fastened to a push rod 40. The push rod 40 is able to slide relative to the primary arm 20. When it does, it changes the relative location of the pivot 38 and thereby causes rotation of the crank 37. The pin 38 connects the crank with the push rod. The pin and push rod are encircled by but not in contact with a U-shaped appendage 42 at the upper end of the arm 20. The U-shaped appendage circles substantially around the pin 38; this provides access to support the pin 23 and the additional pin 36. In this deployment, the push rod 40 is able to operate by applying reciprocating motion in the fashion described below.

The push rod 40 at its upper end is connected with the crank to cause rotation of the crank. At the lower end of the push rod, the rod has an elbow portion with a lateral bend 44 and terminates in a connective tab 45. The tab 45 is the connection point for the main power rod 16. The tab 45 extends above the control arm 20. The bend portion is in an overlying position relative to the arm 20. In that location, the two are joined by a common pin 46. The arm 20 is provided with a slot 47 enabling slippage for reasons to be described.

DESCRIPTION OF OPERATION

Directing attention to FIG. 3 of the drawings, relative movement of the components during operation will be described. The initial description will describe how the sensor pad 25 rides over irregularities in the borehole. Retraction and extension will be discussed thereafter. This will involve a description beginning with FIG. 3 moving to FIGS. 1 and 2 later. With the equipment in the position shown in FIG. 3, assume that an irregular surface is encountered during use of the sensor pad which is otherwise pressed against the borehole. The sensor pad will be deflected and thereby pivots around the pivot 29. When the irregular surface is encountered, the sensor pad is held in the position shown in FIG. 3 initially with a force determined by the leaf spring. As the pad 25 pivots at 29, the force is changed. Assuming all the other components are held stationary, the leaf spring 28 will flex by bowing. It is partially accomplished by rotation of the crank 37. The rod 35 is fixed in length and anchored at both ends so that it cannot move. The push rod 40 is subject to pulling to the left by the power rod 16; this pull to the left is accomplished while yet permitting relative telescoping movement between the primary arm 20 and the push rod 40. Recall that they are joined by the pin 46 but the slot 47 between the two permits slippage. This in turn permits small adjustments in the relative angle of inclination of the parallel members 20 and 40. So to speak, they are able to readjust slightly. Accordingly, when the pad 25 is deflected, there will be both flexure of the leaf spring 28 as it changes curvature and also a small rotational movement of the arm 20. This arm movement slightly changes the location of the arm 22, and in turn that changes the support for the rod 30. The rod 30 connects by slip linkage at the pin 31 and that movement and slippage in conjunction with the other movements assists the sensor pad in keeping facial contact with a bump which otherwise requires deflection of the pad 25 through a substantial angular rotation and also provides a regulated force bearing on the flexed members so that facial contact with an approximately constant force is sustained at the sensor pad 25.

Consider the support linkage system 10 as shown in FIG. 3 at the instant that it is retracted so that the sensor pad 25 is fully stored in the receptacle 13. Movement is accomplished under control of the power rod 16. The arms 20 and 21 rotate in clockwise fashion as viewed in FIG. 3. As they rotate, they carry the sensor pad moving along a locus which is approximately parallel to the full line position shown in FIG. 3, ultimately moving to the full line position of FIG. 2 and finally into the receptacle. The pad 25 is supported in this cantilevered position until it is fully retracted. At intermediate points between the extended and retracted locations, the arms 20 and 21 move approximately parallel. Ultimately, they will be stored in an overlapping state. The bent construction shown for the arms 20 and 21 permits the arm 21 to extend above the pivot 18 and to rotate into a stored position parallel to and immediately adjacent to the arm 20. This downward movement to the retracted state of FIG. 1 is accompanied by some shift in the position of the parallel arms 20, 35 and 40. As shown in FIGS. 1 and 2, the crank 37 is rotated so that it ultimately deflects downwardly, see FIG. 1. This assures that the pad 25 is received totally within the receptacle 13 provided for the pad. FIGS. 1 and 2 jointly show the significance of crank rotation.

Additionally, FIGS. 1 and 2 show the movement of the pin 46 in the slot 47. This relocates the parallel elongate arms 20 and 40 causing rotation of the crank 37. By contrast, the arm 30 is connected to the pin 31 and that connection also is accommodated with a slot 32. The slot 32 comes into play in changing the relative angle of the control arm 30, better shown in contrasting FIG. 1 with FIG. 2.

The retracted and stored condition is shown in FIG. 1 of the drawings. Extension begins in the transition to FIG. 2, thereby positioning the pad out of the receptacle and ready to move into logging connection with the side wall. This process carries the pad out against the side wall. Several valuable benefits are obtained by the present system. For one, the load applied by the sensor pad against the borehole is approximately constant and is assured even when a bump is encountered and the pad rotates in either direction. Another important factor is the location of the pad related to the extension of the power rod 16. Thus, rod translation can be measured and thereby related to the caliper of the borehole. Caliper measurements are not lost when borehole irregularities are encountered. Rather, the caliper measurement depends on the location of the power rod 16 and rotation of the pad 25 on encountering borehole irregularities is not a significant factor. That is, rotation of the pad 25 when bumps are encountered is not a source of false data on borehole caliper. When a bump is encountered and the pad is forced back toward the sonde 11, effectively riding over the bump, that is accompanied by movement of the power rod 16 which causes the equipment to be deployed. The rod 16 is therefore initially measured to provide a reference location and movements of the rod after initial measurement provide borehole caliper during retrieval of the sonde 10.

The foregoing mounting system 10 can be duplicated at one or more locations on the sonde. Primarily, this depends on the equipment mounted on the sonde. The extended sensor pad creates a reactive force which tends to decentralize the sonde in the borehole. This can be overcome by mounting a backup shoe on the sonde and extending the backup shoe to the opposite side of the sonde where the sensor pad is deployed. Another alternate mode is to simply install opposing arm mounting mechanisms which extend in the opposite direction so that the sonde is obtaining simultaneous measurements from both sides of the sonde, thereby tending to centralize the sonde at all times.

While the foregoing is directed to the preferred embodiment, the scope thereof is determined by the claims which follow:

What is claimed is:

1. A sonde supported, sensor pad extension arm which comprises:
   (a) first and second arms pivotally mounted to a sonde for rotation to extend at increasing angles relative to the sonde;
   (b) a remote arm connected between the first and second arms to rotate therewith;
   (c) crank means pivotally joined for rotation relative to said remote arm; and
   (d) a sensor pad remotely mounted from the sonde and supported by a resilient means connecting with said crank means to enable flexure of said resilient means during sensor pad movement on contact with the side wall of a well borehole.

2. The extension arm of claim 1 wherein said remote arm is pivotally connected to said first and second arms to define a four sided figure terminating at four pivots interconnecting the sides thereof and incorporating said first and second arms, and wherein said crank means is supported by the four sided figure.

3. The apparatus of claim 2 wherein said sensor pad is supported on a pivot means supported by said crank means, and further wherein said resilient means urges said sensor pad to a preferred angular position.

4. The apparatus of claim 3 wherein said crank means and sensor pad position said sensor pad to move into a lengthwise receptacle along the length of the sonde while remaining connected to said first and second arms.

5. The apparatus of claim 4 wherein said sensor pad is supported by a pivot means at one end thereof and further wherein said resilient means moves said sensor pad to a preferred angular position with respect to the sonde.

6. A sonde supported, sensor extension arm for deploying a sensor from a sonde in a well borehole during upward movement along the borehole, comprising:
   (a) arm means comprising first and second approximately parallel arms of approximately equal length
      (i) pivotally mounted on spaced and fixed pivot means and wherein said arms additionally support a third arm transversely connected between said first and second arms;
      (ii) on an elongate sonde having an upper end and lower end,
      (iii) wherein said arm means extend an outer end outwardly from the sonde at an angle less than 90° from the lower end
      (iv) so that said arm means pivotally mounts for rotation through angles ranging from approximately parallel to the sonde to a maximum angle less than 90°;
   (b) pivot means carried by said arm means at said outer end;
   (c) pad means supported by said pivot means;
   (d) resilient means bearing against said pad means; and
   (e) wherein said pivot means and said resilient means cooperatively urging said pad means against the side wall of the borehole:
      (i) in facial contact with the side wall of the borehole;
      (ii) extending from said pivot means along the sonde toward the lower end thereof;
      (iii) urged toward the side wall of the borehole with a force within specific limits;
      (iv) rotatable about said pivot means to accommodate borehole side wall variations; and
      (v) is approximately parallel to the sonde.

7. The apparatus of claim 6 wherein said arm means comprises first and second spaced approximately parallel arms of approximately equal length and wherein at least one of the arms is curved to accommodate relative closure of the extension arm toward the sonde, and further including a power rod connected to impart rotation to said arm means.

8. The apparatus of claim 6 wherein said pivot means is located at one end of said pad means, and said pad means has a central portion thereof connected through a moveable connection with said resilient means.

9. The apparatus of claim 8 wherein said pivot means and said resilient means are separately yieldable to enable said pad means to move toward or away from said sonde and also to rotate with such movement.

10. A sonde supported, sensor extension arm for positioning a sensor at a fixed angle relative to a sonde wherein the sensor moves in response to variations in the well borehole, comprising:
    (a) first and second spaced arms;
    (b) first and second pivot mounting means on a sonde spaced therealong to mount said first and second arms for rotation;
    (c) first means connected to said first and second arms;
    (d) second means mounting an elongate sensor pad supported by said first means at a distance from the sonde wherein the distance ranges from a maximum to zero;
    (e) third arm connected to said sensor pad to relatively rotate said sensor pad through a specified angular range;
    (f) means connected to said third arm to vary the angle of said sensor pad through the angular range; and
    (g) wherein said second means includes a pivot means.

11. The apparatus of claim 1 wherein said first spaced arm is approximately parallel to said third arm and said arms have crossover portions which are controllably joined by means of by a pivot pin on one of said arms mounted to extend through an opening in the other of said arms and said opening is a slidable connection between said first and third arms.

12. The apparatus of claim 11 further wherein said first and second pivot mounting means are located in a common receptacle formed in the side of said sonde for receiving said extension arm and sensor pad therein, and further wherein said third arm connects with a motive means to provide movement to said sensor pad.

* * * * *